United States Patent [19]

Dumont et al.

[11] Patent Number: 4,670,973
[45] Date of Patent: Jun. 9, 1987

[54] METHOD OF MAKING AN INSULATING STAY

[75] Inventors: Pierre Dumont, Lyons; Edmond Thuries, Meyzieu, both of France

[73] Assignee: Alsthom-Atlantique S.A., Paris, France

[21] Appl. No.: 822,551

[22] Filed: Jan. 27, 1986

[30] Foreign Application Priority Data

Jan. 25, 1985 [FR] France ................. 85 01087

[51] Int. Cl.⁴ ............................................. H01B 19/04
[52] U.S. Cl. ........................................ 29/631; 156/245;
156/293; 156/294; 264/275
[58] Field of Search .................... 29/631; 174/179;
264/275, 279.1, 272.18; 156/245, 293, 294, 307.3

[56] References Cited

U.S. PATENT DOCUMENTS

| | | | |
|---|---|---|---|
| 2,268,703 | 1/1942 | Dickey | 156/293 |
| 2,440,725 | 5/1948 | Munger | 156/294 |
| 3,336,554 | 8/1967 | Hatton | 156/294 |
| 3,557,447 | 1/1971 | Gruber et al. | 174/179 |
| 4,045,604 | 8/1977 | Clabburn | 29/631 |
| 4,217,466 | 8/1980 | Kuhl | 174/179 |
| 4,331,833 | 5/1982 | Pargamin et al. | 174/179 |
| 4,414,429 | 11/1983 | Kaczerginski et al. | 174/179 |
| 4,440,975 | 4/1984 | Kaczerginski et al. | 29/631 |

FOREIGN PATENT DOCUMENTS 1601379 10/1981 United Kingdom ................. 174/179

Primary Examiner—Percy W. Echols
Attorney, Agent, or Firm—Sughrue, Mion, Zinn, Macpeak and Seas

[57] ABSTRACT

An insulating stay comprises: a central core (1) having high electrical resistance and high tensile strength; a sheath (2) of high electrical resistivity and comprising fins (3) to offer a maximum resistance path to possible surface current losses; and end fittings (4). The central core is made of resin reinforced with long, continuous fibers, and advantageously of epoxy resin reinforced with glass fibers. The sheath (2) is made of a natural or synthetic polymer, and advantageously of EPDM elastomer. The stay is manufactured by coating the central core (1) with a high viscosity glue (8) having high longitudinal resistivity, then wrapping said glue-covered core in a hollow tube (5) of raw elastomer and placing the assembly in a mold (5) where said fins (3) are formed in the sheath (2) and where the raw elastomer (5) is polymerized by vulcanization or reticulation. The stay is intended for bracing electrical installations that need to be insolated and placed at some distance from the ground.

1 Claim, 4 Drawing Figures

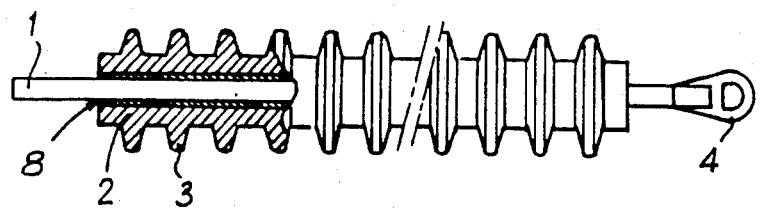
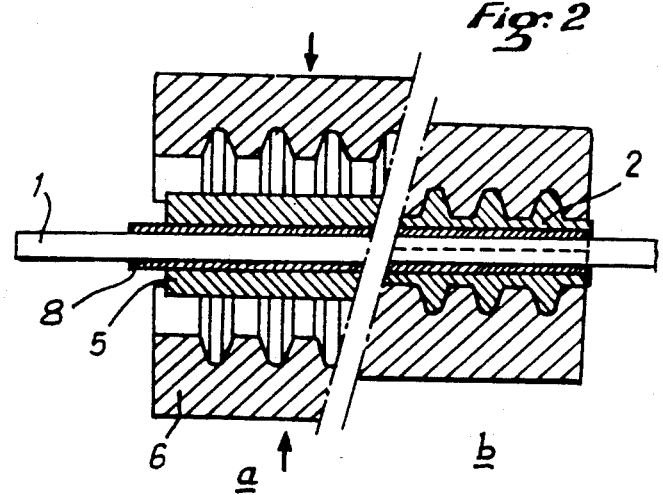
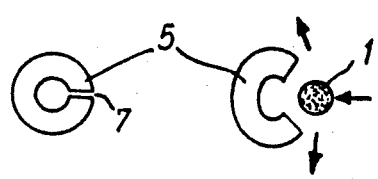
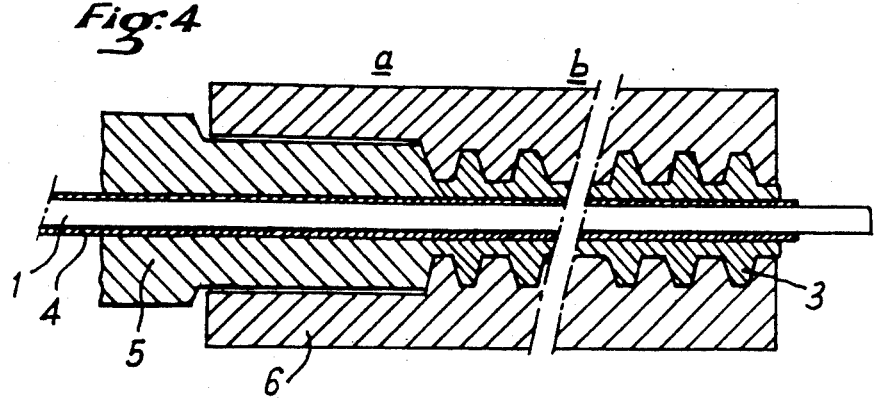

METHOD OF MAKING AN INSULATING STAY

The present invention relates to an insulating stay and to a method of manufacturing the same.

BACKGROUND OF THE INVENTION

Devices for connecting high tension electric current such those which are used on the French power distribution grid, for example, are fixed to support structures situated at a distance from the ground which is a function of the voltage to which the connections with the transport lines are subjected. In order to place such support structures at a suitable distance from the ground, use is made of insulating support columns, generally of ceramic material. A problem arises with the size of such columns in that connection devices are often installed outside and are therefore subjected to bad weather. Under such conditions the support columns must withstand not only the weight of the connection devices and the support structures, but also variable stresses such as the weight of ice and snow, wind forces, electric line traction, etc. In order to solve this problem a first solution consists in over-dimensioning support columns so that they can withstand the most severe stresses conceivable given the shape of the apparatuses and the locations of the installations. A second solution consists in using support columns which are dimensioned to correspond to the weight of the installations which they support and to steady the assembly by means of insulating stays fixed at one end to the support of the connection device, and at the other end to the ground or to other structures fixed to the ground, said other structures being insulating or otherwise.

These solutions are not new, and in particular, the use of stays to brace installations of this type is well-known. However, since the stays used heretofore have been made of ceramics, they are heavy and relatively expensive. Further, the weight of such stays gives them a curve which is bad for adjusting their mechanical tension and for ensuring that columns stayed thereby have the proper shape.

The present invention seeks to solve this problem in a completely satisfactory manner by providing an insulating stay which, for given configuration and traction strength, is much lighter and cheaper than a ceramic stay.

SUMMARY OF THE INVENTION

The present invention provides a method of manufacturing an insulating stay for bracing high-tension electrical devices, said stay comprising a central core of high resistivity and high tensile strength, and a sheath of high resistivity and including fins for providing a maximum resistance path to such surface conductivity current losses as may occur due to pollution, said method of manufacture comprising the following steps:

the central core is covered with high viscosity glue;

the glue-covered central core is wrapped in a hollow cylindrical tube of elastomer by: (a) slitting the tube along its entire length; (b) opening the slit tube; and (c) inserting the central core sideways through the longitudinal slit in the tube;

molding the resulting assembly to form fins in the tube; and polymerizing the elastomer by vulcanization or reticulation.

The invention also provides a stay obtained by performing the above method.

The central core of the stay may be made of resin reinforced by long continuous fibers, such as epoxy resin reinforced with glass fibers.

The sheath may be made of a natural or synthetic elastomer, for example it may be made of silicone resin or an EPDM (ethylene-propylene-diene-monomer) elastomer, etc., or of a polymer such as polytetrafluoroethylene. Other materials could also be used.

BRIEF DESCRIPTION OF THE DRAWING

An implementation of the invention is described by way of example with reference to the accompanying drawing, in which;

FIG. 1 is an elevation view in partial longitudinal section of a stay in accordance with the invention;

FIG. 2 is a longitudinal section of a stay and of a mold for manufacturing the stay, with portion a being prior to mold closure and portion b being after mold closure;

FIG. 3 is a cross-section view of the tube in which the mold will form the fins of the stay, with portion a showing the tube prior to the stay core being placed therein, and portion b showing the tube while the stay core is being placed therein: and FIG. 4 is a longitudinal section through both ends of the stay in the manufacturing mold.

MORE DETAILED DESCRIPTION

FIG. 1 shows a stay in accordance with the invention. The stays is essentially constituted by a core 1 which is intended to withstand all of the traction forces, together with a sheath 2 surrounding the core 1 and having fins 3. There are also two end fittings 4 fixed to respective ends of the core 1. The purpose of the fins 3 is to increase the surface area of the sheath 2, i.e. to increase the flash-over length and consequently to increase the resistance of any conductive path which may be constituted by dust being deposited on said sheath.

The materials used to make a stay in accordance with the invention are the following: the core is constituted by resin which is reinforced with long, continuous, and insulating fibers, and advantageously by epoxy resin reinforced with glass fibers. The sheath is constituted by a synthetic material, e.g. a polymer, which combines several characteristics such as watertightness, high resistivity, and high resistance to the effects of ultraviolet radiation, of ozone, and of water. This material may be a silicone resin, polytetrafluoroethylene (PTFE often known by the trademark "Teflon"), or, advantageously, EPDM (ethylene-propylene-diene-monomer) or EPT (ethylen-eproylene-terpolymer) elastomer. The advantage of an elastomer such as EPDM, for example, in this type of application is that it is easily molded which makes it easy to shape the fins. The various above-mentioned materials have a very much lower density than ceramic materials, and for given tensile strength they provide stays in accordance with the invention having slightly lower resistivity (but sufficient for the use intended) and which are much lighter than ceramic stays.

In order to manufacture stays in accordance with the invention, a core of extruded reinforced resin 1 is covered with a layer of glue 8 (a resin having high viscosity and high longitudinal dielectric strength). A hollow cylindrical tube 5 of raw elastomer is then disposed around the glue-covered core 1. In order to do this and to ensure that the layer of glue remains uniform, the core 1 is not threaded along the tube 5, but the tube 5 is slit longitudinally (see FIG. 3a) and is wrapped sideways around the core 1 (see FIG. 3b). The assembly is then inserted in a mold which gives the cylindrical tube 5 the shape of the fins 3 and in which the raw elastomer of the tube is polymerized by vulcanization or reticulation. During this operation the sides of the slit 7 made in the tube weld together and the sheath 2 obtained after unmolding is entirely uniform. When it is desired to make very long stays (the longest stays currently used being about 10 meters long) the molds available can only be of limited length, and the manufacturing method may be performed in several successive molding passes by ensuring that a non-shaped and non-polymerized portion of elastomer extends beyond one end of the mold on a first pass and is received in the other end of the mold during a second pass, as shown in FIG. 4. It is thus possible to obtain one-piece stays of any desired length. Beyond some maximum portion length, ceramic stays must be built up from a plurality of portions.

The present invention is not limited to the embodiments described above, and it may be modified by the person skilled in the art while still remaining within the scope of the claims.

We claim:

1. A method of manufacturing an insulating stay for bracing high-tension electrical devices, said stay comprising a central core of high resistivity and high tensile strength, and a sheath of high resistivity and including fins for providing a maximum resistance path to such surface conductivity current losses as may occur due to pollution, said method of manufacture comprising the following steps:

covering the central core with high viscosity glue;

wrapping the glue-covered central core in a hollow cylindrical tube of elastomer by: (a) slitting the tube along its entire length; (b) opening the slit tube; and (c) inserting the central core sideways through the longitudinal slit in the tube;

molding the resulting assembly to form fins in the tube; and polymerizing the elastomer by vulcanization or reticulation.

* * * * *